Nov. 16, 1965     R. S. O. ZANE     3,218,624
ATTITUDE DEVIATION INDICATING DEVICE
Filed March 25, 1963
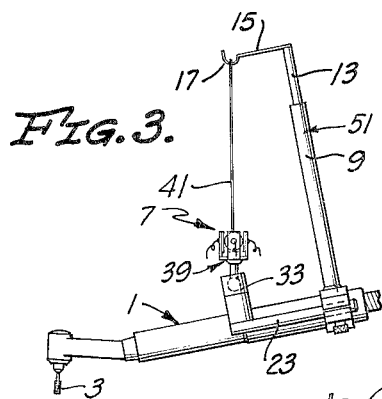
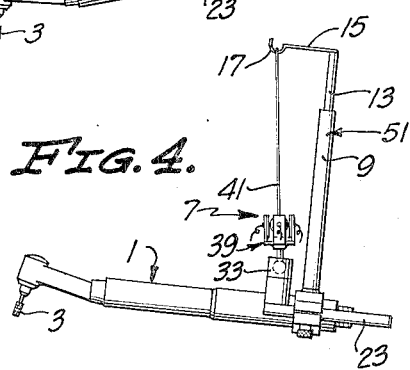
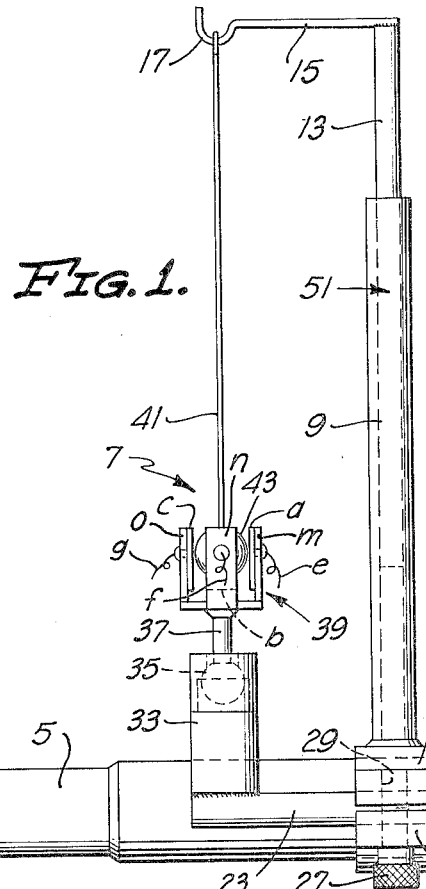
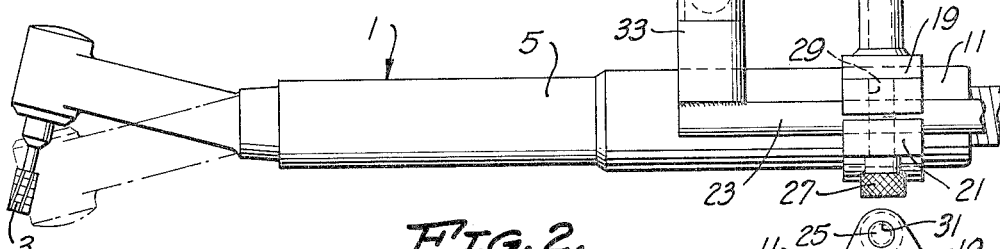
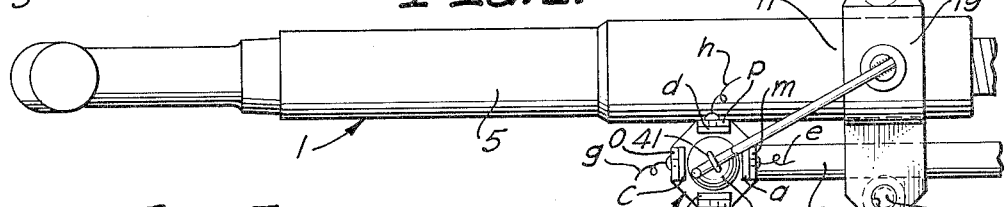
INVENTOR
RONALD S. O. ZANE
BY
ARANT & MALTBY
ATTORNEYS
John H. Crowe AGENT

United States Patent Office

3,218,624
Patented Nov. 16, 1965

1

3,218,624
ATTITUDE DEVIATION INDICATING DEVICE
Ronald S. O. Zane, 2572 Hamner Ave., Norco, Calif.
Filed Mar. 25, 1963, Ser. No. 267,414
1 Claim. (Cl. 340—282)

This invention relates to a device for indicating the deviations of a tool or the like from a predetermined attitude. More particularly, the invention relates to such a device having utility as a parallel indicating device for sensing and signalling attitude deviations of dental burs during use for tooth reduction in fixed partial situations.

In correcting dental irregularities, dentists frequently find it advisable to fill gaps between teeth such as those resulting from the extraction of decayed or otherwise defective molars. A common way of filling these gaps is by means of dental bridges, a dental bridge being, as the name implies, a connecting "bridge" between the teeth abutting the gap (hereinafter referred to as abutment teeth). Dental bridges typically consist of anchoring caps or crowns firmly attached (or attachable) to the abutment teeth and an intermediately integral span portion which fills the gap and serves as an effective substitute for the missing tooth. Bridges are almost always made of gold because its physical and chemical properties uniquely suit it for the purpose. To provide a functional substitute for the missing tooth, insofar as possible, and also for the sake of appearance, the span portion of the bridge is normally formed in a shape approximating that part of the tooth thereby replaced. Since dental bridges, per se, form no part of the present invention, it is not necessary to describe them in any further detail or go into the details of their methods of preparation here.

Before abutment teeth can effectively serve as abutments for dental bridges, it is necessary to grind them to proper shape and size for optimumly interfitting relationship with bridge crowns. This interfitting relationship is of significant importance since without a satisfactory fit between crown and tooth the bridge will be improperly anchored and therefore more readily vulnerable to dislocation under slight stresses. The conventional way of shaping and sizing abutment teeth to desired dimensions is to grind their outer layers away with a dental bur, or, as it is sometimes called by laymen, a drill. Dental burs, come in many shapes and sizes as a result of the many different grinding functions they must perform. Dentists normally use a cross-fissured, sometimes called a taper-fissured, bur for reducing abutment teeth to proper dimensions for bridge abutment purposes. This type of bur resembles a miniature rat tail file to some extent in that it has a shaft-like configuration with grooves on its cutting surface. The cutting surface is typically made of carbide.

For reasons presently evident, there is no necessity for here going into the intricacies of tooth reducing or shaping procedures. However, one aspect of tooth shaping is of present significance to aid in an understanding of my invention. For reasons well known to dentists, and not necessary to enlarge upon here, it is essential that the side walls of abutment teeth be ground to substantial flatness and, further, that they either be substantially lacking in taper or tapered upwardly from gum line to crown. Hereinafter, in accordance with customary usage among dentists, this state of geometrically ideal side wall configuration will be referred to as side wall parallelism, although it is realized that the literal definition of parallelism is not coterminous with its connotation as presently employed.

Because of the relatively small size of human teeth, dental burs must, of necessity, be much smaller than the handpiece to which they are attached when in service. As those familiar with the uses of dental tools will attest, the guiding of burs through their intricate grinding and shaping maneuvers by manipulation of their much larger handpieces requires a great deal of skill and effort and the operator must constantly guard against even the smallest unwanted positional change of the handpiece since this is transmitted to the bur in amplified effect with possibly harmful consequences to the patient.

As the attached drawings show, dental burs are integral with shafts, adapted to rotate rapidly, and they present a whirling abrading or grinding surface around their peripheral boundaries when in use. When a bur is in use, its shaft is securely fastened to the handpiece by chuck means, and the handpiece is manually controlled, as previously indicated, to guide the cutting or abrading surface of the bur through its necessary travels. It will be apparent that any rocking, tilting, twisting or rotating of the handpiece will bring about a concurrent change in the contactual relationship between the whirling grinding surface of the bur and the surface of the tooth being worked on. Any such contactual change, of course, results in at least some alteration in the contour of the tooth surface. If the rocking, tilting, twisting, etc., motion of the workpiece is unintentional, the resulting change in tooth surface configuration could have serious consequences. At the present time the guidance of dental burs is normally accomplished solely by the skilled hand and professional eye of the operator, without the use of any mechanical aids. It is extremely difficult, if not impossible, to achieve a high degree of parallelism in tooth side walls by such artisan means, although dentists have long succeeded in installing dental bridge work of excellently lasting quality in spite of this.

For reasons believed obvious from the foregoing, it is of prime importance in the guidance of dental burs to obviate, insofar as possible, unwanted handpiece tilting, twisting, etc., movements or, to put it another way, unwanted changes in attitude of the handpiece, which reflect themselves in unwanted changes in attitude of the bur itself. The term "attitude" is here used, for lack of a more specifically descriptive one, to connote a fixed geometrical relationship, with respect to a plane parallel to the surface of the earth, of the thing whose attitude is under consideration, the plane passing through any given part of said thing and its longitudinal and latitudinal orientation being disregarded. While this definition might seem complex, the attitude concept here employed will, it is believed, become clear as the description of the invention proceeds, since the concept itself is quite simple.

For reasons believed fairly obvious from the above discussion, the grinding of abutment teeth to the optimum conditions of side wall parallelism requires long periods of bur usage at fixed attitudes and a substantial part of the dentist's burden in performing these grinding tasks lies in the necessity of maintaining constant instrument attitude for such extended time periods. This necessarily puts a strain on the operator's nerves and undoubtedly results in a slower rate of work than would otherwise obtain. I have now invented a device readily attachable to dental handpieces which substantially relieves the dentist of the necessity of maintaining constant attitude control through conscious hand orientation of his instrument and which thereby brings about advantages in nerve strain elimination and consequent faster work pace.

Briefly, the device of this invention is adapted to sense and instantaneously signal the operator of any change of a rotating bur from a prearranged attitude, and also the direction of the change so that the operator can make immediate correction by moving the tool in the proper direction before any significant amount of harm has been done. It is normally not necessary to keep more than a cursory vigil on the signalling mechanism of my device since the signals are sufficiently compelling to attract immediate attention and are of such character as to insure prompt corrective action. The substantial differences in quantity and quality of attention demand on the operator between the complete manual control of the attitude of dental burs now almost universally practiced in the profession and the minimal control and alertness technique employing my attitude indicating device are believed readily apparent. By using said attitude indicating device in the manner taught herein, gradual attitude drift, always inherent in human control methods, can be detected and immediately eliminated while in the incipient stage, and long before it has had a chance to reach a damaging potential.

It is thus the principal object of this invention to furnish means for detecting and indicating changes of attitude of a working tool.

It is another object of the invention to furnish such means capable of indicating the direction of deviation, from a prearranged attitude, of attitude changes of the working tool.

It is still another object of the invention to furnish an attitude deviation sensing device capable of indicating the direction of the deviation from a calibrated norm particularly adaptable for use on dental bur handpieces.

It is still another object of the invention to furnish such an attitude deviation sensing device adaptable for use on dental bur handpieces by means of which burs are readily maintainable at a fixed attitude in service and substantial parallelism of the side walls of teeth undergoing reduction is thereby assured.

Other objects, features and advantages of my invention will be readily apparent from the following description thereof taken in conjunction with the accompanying drawings of which:

FIGURE 1 is a longitudinal elevational view of a dental tool, comprising a dental bur and handpiece, with an attitude deviation sensing and indicating device in accordance with this invention attached thereto;

FIGURE 2 is a plan view of the dental tool with attached attitude deviation sensing and indicating device of FIGURE 1;

FIGURE 3 is an elevational view of the dental tool with attached attitude deviation sensing and indicating device of FIGURE 1, in reduced scale, showing an adjustment of the sensing and indicating device for a calibrated attitude different from that illustrated in FIGURE 1;

FIGURE 4 is an elevational view of the FIGURE 1 dental tool and deviation sensing and indicating device assembly, in reduced scale, similar to FIGURE 3 but showing an adjustment of the sensing and indicating device for still another attitude different from that illustrated in FIGURE 1; and FIGURE 5 is a schematic wiring diagram of a circuit for conveying warning signals from my attitude deviation sensing device to a tool operator upon deviation of said tool from a prearranged attitude.

Considering now the drawings in detail, FIGURES 1 through 4 show a dental tool 1 having a bur 3 and a handpiece 5 for holding and guiding the bur in use. Attached thereto is one illustrated embodiment of the attitude deviation sensing and indicating device of this invention. Hereinafter, for the sake of brevity, the device of this invention will be referred to simply as an attitude indicator, although it is to be realized that the device indicates attitude only in the limited sense that it monitors one particular attitude for which it has been calibrated.

Referring again to the drawings, it will be seen that the particular embodiment of my attitude indicator there illustrated comprises an upright tubular receptacle 9 firmly, but detachably, secured to the base 11 of handpiece 5 in a manner hereinafter described in detail. Telescopically inserted within tubular receptacle 9 is a section of suitably sized tube 13, to which is fixedly secured, at its upper end as shown, a thin, rod-like projection or arm 15 in axially perpendicular relationship thereto, said rod-like projection having a hook-like bend 17 in its outwardly extended end. The internal and external diameters of tubular receptacle 9 and tube section 13, respectively, are such as to assure a snug fit between those elements when they are assembled as shown, but still allow telescopic adjustment therebetween to permit regulation of the distance of extension of the two-element assembly, hereinafter referred to as telescopically adjustable arm 51. The reasons why such telescopic adjustability is desirable will become apparent as the description of the invention proceeds.

To aid in improved adjustability of the telescopic fit between elements 9 and 13, the former can, if desired, be slotted around its open upper end. For reasons later made clear, the preferred material of construction for the elements so far considered is an electrically conductive metal such as copper, brass, or the like.

Tubular receptacle 9 is supported in its upright position atop handpiece 5 by integral attachment to the upper 19 of two appropriately hollowed out clamp bars 19 and 21 of conductive metal, designed to fit around the base 11 of handpiece 5 and firmly grip it when in clamped position. Fastening means for upper and lower clamp bars 19 and 21, respectively, are two knurled head fastening screws 25 and 27, one of which, 25, is shown holding the clamp bars together in their fully fastened position in FIGURES 1 through 4, the other, 27, being mostly hidden from view, except for its tip which is visible in a female screw opening 29 in upper bar 19, shown on FIGURE 2, in which it is designed to turn in its clamp tightening or loosening function. The corresponding opening for the female screw receptive of fastening screw 25 is shown at 31 on the drawings.

In addition to fitting around the base of handpiece 5, clamp bars 19 and 21 are designed to fit around and secure a tubular section, or arm, 23 in parallel relation thereto. The manner in which arm 23 is held by the clamp bars 19 and 21 is believed obvious from the drawings. Also believed obvious from the drawings, is the fact that both handpiece 5 and arm 23 are longitudinally adjustable in the clamp bars. The desirability of this type of adjustment will become apparent as the description of the invention proceeds.

Arm 23 supports a perpendicularly disposed socket housing 33 for a ball-and-socket joint 35, the ball shaft 37 of which, in turn, supports an open topped cage-like structure 39 having four vertical contact strips a, b, c and d of an electrically conductive material, such as copper, gold, or silver, disposed at points equidistantly spaced around its lateral periphery. Wire leads e, f, g and h connect contact strips a, b, c and d to signal lamps i, j, k and l, respectively, in a parallel circuit arrangement such as shown in the FIGURE 5 wiring diagram. The signal lamps are preferably of four different colors for reasons presently made clear, and all are connected, through a common lead, to one pole 47 of a source of D.C. electrical energy 45, such as a small dry cell, in the manner indicated in FIGURE 5.

Suspended from hook-like bend 17 in the end of projecting arm 15, by a conductive wire 41, is a sphere 43 made of an electrically conductive metal. Sphere 43 is fastened to conductive wire 41 in such fashion as to permit free pendulum-like suspension thereof with the center of gravity of the sphere substantially in line with the wire. The means of fastening between wire 41 and sphere 43 can be of any suitable kind, such as brazing, soldering, etc., means, so long as electrical conductivity therethrough is preserved. A wire lead, not shown on the drawing, connects sphere 43 with pole 49 of D.C. energy source 45, pole 49 being opposite to pole 47 which, as previously indicated, is connected to signal lamps *i, j, k* and *l*. The wire lead connecting sphere 43 with D.C. energy source 45 preferably runs from the latter to an electrode contact, not shown, on upper clamp bar 19. In such case the current flows (between sphere 43 and said electrode contact), when the circuit is energized, through wire 41, projecting arm 15, telescoping arm elements 13 and 9, and clamp bar 19, all of these parts, as previously indicated, being constructed of electrically conductive material for the precise purpose of making this possible.

It is, of course, possible to connect D.C. energy source 45 in circuit with sphere 43 by fastening the end of a conductor from the former to almost any part of the assembly shown in the drawings except contact strips *a, b, c* or *d* which (as will presently be seen, are insulated from the rest of said assembly). It is necessary only that there be an uninterrupted path for the flow of current between sphere 43 and the point of contact of the conductor with the apparatus and this is possible almost regardless of where such point of contact is, except for the narrow limitation above specified, because of the electrically conductive nature of almost all materials of construction of both the dental tool and attitude indicator of this invention. The reason for not fastening the conductor to any of contact strips *a, b, c* or *d* should be obvious but the following discussion of the manner in which my attitude indicator is employed and functions will make it even more so.

Prior to use, my attitude indicator is installed on a dental bur handpiece, or other appropriate tool handle, in proper calibration for a prearranged attitude. Using the drawings for purposes of exemplification, this is accomplished by making the necessary supporting arm length, and other, adjustments to permit sphere 43 to hang in free and unhindered suspension within cage-like structure 39 substantially equidistant from each of surrounding vertical contact strips *a, b, c* and *d*. Such calibration is possible because of the many types of built-in adjustment means, later discussed in greater detail, which form a part of the apparatus of this invention.

Since sphere 43 must, as indicated, always hang free, in this respect resembling a plumb bob, the angle of its suspending wire 41 with projecting arm 15 will vary as the attitude of handpiece 5 is altered in response to necessary changes in the attitude of bur 3. This change in wire angle with bur attitude change is well illustrated in FIGURES 1, 3 and 4, FIGURE 1 showing handpiece 5 disposed in horizontal attitude and FIGURES 3 and 4 showing handpiece 5 tilted from the horizontal in each of the two possible directions, respectively. Obviously, changes in tilting attitude of handpiece 5 of the type denoted (sometimes hereinafter, by analogy to nautical terminology, referred to as pitch-type attitude changes) require adjustment of the distance between cage-like structure 39 and telescopically adjustable arm 51 to assure the necessary axial coincidence of said structure with suspended sphere 43. This adjustment is accomplished by sliding arm 23 back or forth as necessary through its seating recesses in clamp bars 19 and 21, with fastening screws 25 and 27 loosened, to the proper position and then clamping it firmly in place by tightening said screws. It is desirable to avoid rotation of arm 23 during these adjustments inasmuch as possible. The possibility of such rotation is eliminated by having arm 23 of other than circular cross-sectional shape (square, triangular, etc.) and the recesses in clamp bars 19 and 21 shaped to approximately conform thereto.

As the position of telescopically vertical arm 51 varies with the vertical as a result of necessary attitude shifts of dental tool 1, its length must obviously vary to compensate for the differences in distance between hook 17 in the end of suspending arm 15 and cage-like structure 39 resulting from the necessity of moving the latter in the above-described manner for the reason there denoted. This explains the reason for the telescopic adjustability feature of arm 51. As the drawings show, there are two other adjusting means, besides those specifically discussed, in the illustrated attitude indicating device, one being the clamp bar 19 and 21 arrangement (making radial adjustment of the attitude indicator, with respect to handpiece 5, possible) and the other being ball-and-socket joint 35 (making it possible to maintain cage-like structure 39 in true vertical alignment, and hence axially coincident with sphere 43 and its suspension wire 41, regardless of the angle of tilt from true horizontal of handpiece 5). The radial adjustment made possible by clamp bars 19 and 21 is illustrated by FIGURE 2 which demonstrates, by partial phantom outline means, attachment of the attitude indicator in two radially extreme positions on handpiece 5. Thus the handpiece is there shown with the attitude indicator in one extreme position vertically upstanding on its back and the bur shaft pointing downwardly, and also in the oppositely extreme position, vertically upstanding on the underside of the handpiece, in the latter case the bur chuck (see phantom outline) being so positioned that the bur shaft, when installed, points upwardly.

Since my attitude indicator depends upon the force of gravity acting on sphere 43 for its successful operation, the suspending structure for the sphere must always be in vertically upstanding position on a dental bur handpiece or other tool handle. However, a dental tool must be suitable for use in practically any position or attitude because of the many possible angles of approach to the many teeth work sites which dentists must be prepared to reach. For example, when working on upper teeth the dentist must normally hold the handpiece in what is an upside down position with respect to its position when used on lower teeth. In any event, the radial adjustment made possible by bar clamps 19 and 21 provides a ready means of adjusting the attitude indicator to any radial position of the handpiece necessitated by the exigencies of the situation.

The manner of operation of my attitude indicator and its range of adaptability and versatility to meet the varying demands inherent in the necessity of grinding abutment teeth of all degrees of accessibility will, it is believed, be apparent from the foregoing discussion considered in conjunction with the accompanying drawings. The functioning of the attitude indicator, however, can be briefly explained as follows. Calibration of the attitude indicator by attachment to a dental tool in operative position at a particularly desired attitude results in the suspension of sphere 43 (this discussion will, for purposes of simplicity, continue to refer to the various elements of my attitude indicator in terms of the appropriately corresponding numbers on the drawings) in non-touching relationship within cage-like structure 39. Preferably, sphere 43 is centrally disposed within structure 39, that is, equidistant from each of contact strips *a, b, c* and *d*, but it is not limited to such central disposition and can be adjusted to hang in non-symmetrical proximity to the contact strips if desired.

So long as the dental tool, with the thus calibrated attitude indicator mounted on it, does not change its attitude, sphere 43 continues to hang in free suspension unhindered by contact with anything other than its suspending wire 41 and no warning signal of any sort is given out by the indicator. This is not difficult to understand since, as previously hinted, the attitude indicator gives its warning signals in the form of light flashes from one or more of colored lamp bulbs *h, i, j* or *k* and when sphere 43 is hanging in free suspension at its calibrated attitude none of said lamp bulbs is in closed circuit with D.C. power source 45. If, however, the dental tool deviates from its calibrated attitude by longitudinal tilt or transverse twist, or both, sphere 43, following the dictates of gravity, will be urged in whatever direction, with respect to contact strips *a, b, c* and *d*, it must go to remain suspended directly under hook 17 of arm 15. If the deviation is of sufficient magnitude, sphere 43 will be stopped by one or two of said contact strips, the particular strips thus contacted depending upon the character and direction or directions of said deviation. When this occurs, each of signal lamps *h, i, j* and *k* in circuit with a contact strip touched by the sphere will be instantaneously energized since its circuit is thereby closed with respect to D.C. power source 45.

Since, as indicated, the signal lamps are of four different colors, the particular color of any one activated in this manner gives an indication of the direction of attitude deviation from the calibrated norm of the dental tool and thus enables the operator to immediately make the required compensating movement to bring the tool back to its proper operating attitude. This explanation is adequate, it is felt, to make the principle of operation of my invention clear.

Viewed in its broadest mechanical aspect, the present invention comprises a gravity actuated attitude deviation sensing device in combination with deviation indicating means capable of translating sensed deviations from a predetermined attitude into signals of such character as to give warning of the deviations and, additionally, indicate their nature (pitch roll-type, or both) in such manner as to instantly alert the operator of the tool to which the device is attached of the need for, and kind of, corrective action required to restore the tool to its proper operating attitude.

While my attitude indicator has been heretofore described, and is illustrated in the accompanying drawings, with emphasis on one particular and preferred embodiment thereof, it will be apparent that the reach of the invention encompasses other attitude sensing and information imparting signalling means as well. One example of a gravity actuated attitude sensing means, other than the suspended sphere type described, comprises crossed tubes filled with mercury or other electrically conductive liquid with electrodes analogous to contact strips *a, b, c* and *d* disposed at each end out of contact with the liquid at calibrated attitude, and so connected with a D.C. power source and signal lamps similar to lamps *h, i, j* and *k* as to cause appropriate lights to go on and give informational signals as a result of attitude deviations, when attitude deviations of the liquid containing tubes cause liquid displacement sufficient to bring about contact of said liquid with appropriate one(s) of said electrodes.

Examples of information imparting signalling means other than the colored lamp arrangement described are audio signalling hookups in which different sounds are utilized to signal different directions of attitude deviation, the sound emitters being employed in circuitry similar to that shown in the FIGURE 5 diagram or in electronic buzzer transmission systems in which no wires are necessary. Combinations of the above sensing and signalling expedients, or their equivalents, are, of course, within the scope of this invention. It is to be understood that the foregoing disclosures are merely exemplary and not to be construed as limitative in character or effect. In this connection, it should be emphasized that any means capable of indicating attitude deviations in accordance with the teachings herein falls within the spirit and scope of this invention and forms a part thereof so long as it remains within the bounds of the appended claims following hereinafter.

While, as previously pointed out, most parts of the dental tool and attitude indicator combination illustrated in the drawings are made of electrically conductive material, contact strips *a, b, c* and *d* must be insulated in some fashion from any part of the tool-indicator assembly in conductive connection with D.C. power source 45 since otherwise the current would short circuit sphere 43 thus causing all of the signal lamps to glow continuously. Insulation for the contact strips can consist of non-conductive backing strips, such as shown at *m, n, o* and *p* on FIGURES 1 and 2; a non-conductive ball-and-socket joint 35; or the like.

While the primary contemplated use of my attitude indicator is to sense and signal a warning of the attitude deviations of dental burs, particularly burs in use for abutment tooth reduction purposes (or, in technical language, in fixed partial situations) where the immediate correction of incipient attitude deviations is important for the continued maintenance of side wall parallelism, the indicator is not limited to such use and can be employed to monitor the attitude integrity of any working tool or device on which it can be properly installed and utilized. It should be noted and emphasized that the graphically illustrated embodiment of my attitude indicator can be modified in many ways, for purposes of refinement or otherwise, and that, so long as its basic nature and function remain unchanged, all modifications and variations thereby resulting are within the purview of this invention. One example of one such modification would be the alteration of projecting arm 15 from its present rigid character to a condition of telescopic adjustability. Another example would be the use of a suspended weight of other than spherical shape in lieu of sphere 43.

Returning momentarily to consideration of the drawings, one point in connection with the functioning of telescopically adjustable arm 51 has not previously been mentioned, although such will be obvious from an understanding of the mechanical functionality of that element in its illustrated context. The point referred to is the swivel adjustability of arm 51. That member, in addition to being telescopically adjustable as to length, is swivelly adjustable in the sense that its insertive member 13 can be twisted or turned through any desired angle relative to upright tube member 9, and, as a result of the frictionally binding fit between members 9 and 13 necessitated by their telescopic adjustability character, will remain at any angular setting until moved to another one. This type of angular adjustability, or an equivalent functional variant, is needed in the figured embodiment of my invention to permit adjustment of the direction of projection of arm 15 as the occasion demands because of changes in position of cage-like structure 39 to meet the changing attitude requirements of dental tool 1.

My attitude indicator is not limited to the use of only four directional signal means, and any practicable number of such means can be employed within the scope of my invention. For example, instead of only four contact strips, such as strips *a, b, c* and *d* distributed as shown on the drawings, particularly FIGURE 2, there could be six, or even more, such strips distributed around sphere 43, preferably, but not necessarily, equidistantly spaced from each other and each being the same distance from sphere 43.

I claim:

A device for sensing and giving warning signals of the deviation of a dental tool, to which it is attached, from a prearranged attitude comprising, when installed in operating position:

(a) a freely swinging sphere made of an electrically conductive material;

(b) an electrically conductive wire supporting said sphere in its freely swinging condition and permitting it to swing in any direction;

(c) supporting means for said wire and the sphere supported thereby comprising a telescopically adjustable arm having an upper insertable element and a lower receptacle element secured in perpendicularly upstanding relationship on the handpiece of said dental tool and an outwardly projecting arm with a hook in its outwardly disposed end to which the upper end of said wire supporting said sphere is fastened, the interfitting relationship of said upper insertable element and said lower receptacle element of said telescopically adjustable arm being of sufficiently binding character to afford support of the weight of said sphere without slippage but still permit swivel adjustment of said outwardly projecting arm;
(d) a plurality of electrical contact strips disposed laterally around said freely swinging sphere forming a cage-like perimeter defining the outer limits of permissible swing of said sphere comprising a platform-like floor with spaced upstanding panels fixedly secured around its outer perimeter to which said contact strips are attached, supported through a ball-and-socket joint for leveling purposes by a tubular member disposed in parallel relationship to the handpiece of said dental tool;
(e) said telescopically adjustable arm and said tubular member disposed in parallel relationship to the handpiece of said dental tool being attached to said handpiece of said dental tool by bar clamp means;
(f) said bar clamp means comprising a pair of bars with hollowed out recesses adapted to receive said handpiece of said dental tool and said tubular member and hold them in parallel relationship when clamped therearound;
(g) said telescopically adjustable arm being fixedly secured to the top bar of said bar clamp means in perpendicularly upstanding relationship thereon;
(h) whereby said telescopically adjustable arm, the position of said tubular member supporting the contact strip floor and panel supporting assembly, said ball-and-socket joint and the radial relationship of said bar clamp means to the handle of said dental tool are separately and cooperatively adjustable to obtain the optimum position of said sphere in relation to said contact strips for any desired operating attitude of said dental tool;
(i) a source of D.C. electrical energy;
(j) a plurality of colored lamps, each lamp being of a different color, the number of lamps corresponding to the number of said electrical contact strips;
(k) wiring means conductively connecting said electrical contact strips to one pole of said source of D.C. electrical energy, said wiring means connecting said colored lamps in parallel, each lamp being connected to a separate one of said contact strips;
(l) wiring means conductively connecting said sphere with the pole of said source of D.C. electrical energy opposite to that to which said lamps are connected; and
(m) insulating means separating each of said contact strips from said sphere in the absence of contact therebetween;
(n) whereby attitude deviation of said dental tool causes said sphere to swing in a particular direction relative to said plurality of electrical contact strips, and if the deviation is of sufficient magnitude, to contact at least one of said strips thereby closing the circuit of any strip so contacted and said source of D.C. electrical energy and causing the colored lamp in that circuit to light up and indicate attitude deviation of a character readily determinable by the color of said lamp, thereby giving warning of the need for specific corrective adjustment to bring the dental tool back into its proper attitude.

References Cited by the Examiner

UNITED STATES PATENTS

| | | | |
|---|---|---|---|
| 960,718 | 6/1910 | Schtabe | 33—207 |
| 1,576,260 | 3/1926 | Waite | 33—207 |
| 1,907,402 | 5/1933 | Fedor | 340—282 |
| 2,334,316 | 11/1943 | Cloud | 200—61.51 |
| 2,517,295 | 8/1950 | Esher | 33—215.2 |
| 2,541,366 | 2/1951 | Kennedy | 33—207 |
| 2,562,567 | 7/1951 | Moledzky | 200—61.51 |
| 2,873,531 | 2/1959 | Chick | 33—216 |

FOREIGN PATENTS

| | | |
|---|---|---|
| 354,444 | 8/1931 | England. |
| 1,166,428 | 11/1958 | France. |
| 583,425 | 9/1933 | Germany. |
| 411,968 | 8/1945 | Italy. |

NEIL C. READ, *Primary Examiner.*